United States Patent
Ino

(10) Patent No.: US 11,922,089 B2
(45) Date of Patent: Mar. 5, 2024

(54) VEHICLE CONTROLLER, VEHICLE DISPLAY SYSTEM, AND VEHICLE DISPLAY CONTROL METHOD USING A SINGLE DISPLAY PROCESSING UNIT FOR DISPLAYING LINK IMAGES

(71) Applicant: DENSO CORPORATION, Kariya (JP)

(72) Inventor: Yuko Ino, Kariya (JP)

(73) Assignee: DENSO CORPORATION, Kariya (JP)

( * ) Notice: Subject to any disclaimer, the term of this patent is extended or adjusted under 35 U.S.C. 154(b) by 183 days.

(21) Appl. No.: 17/457,134

(22) Filed: Dec. 1, 2021

(65) Prior Publication Data
US 2022/0083305 A1 Mar. 17, 2022

Related U.S. Application Data

(63) Continuation of application No. PCT/JP2020/018897, filed on May 12, 2020.

(30) Foreign Application Priority Data

Jun. 4, 2019 (JP) ................................. 2019-104769

(51) Int. Cl.
*G06F 3/14* (2006.01)
*B60K 35/00* (2006.01)
(Continued)

(52) U.S. Cl.
CPC ............ *G06F 3/1431* (2013.01); *B60K 35/00* (2013.01); *G06T 3/60* (2013.01); *G06T 13/00* (2013.01);
(Continued)

(58) Field of Classification Search
None
See application file for complete search history.

(56) References Cited

U.S. PATENT DOCUMENTS 7,880,602 B2 * 2/2011 Kasamatsu ............... B60R 1/00
348/333.03
2013/0033503 A1 * 2/2013 Besnard ................. G09G 5/397
345/502

(Continued)

FOREIGN PATENT DOCUMENTS

EP 1439455 A1 * 7/2004 ............. B60K 35/00
JP 2005-162190 A 6/2005
(Continued)

*Primary Examiner* — Patrick F Valdez
(74) *Attorney, Agent, or Firm* — Harness, Dickey & Pierce, P.L.C.

(57) ABSTRACT

A vehicle controller is configured to control a plurality of display units disposed in a vehicle interior. The vehicle controller includes: a single display processing unit that is configured to perform preprocessing on a plurality of link images for the plurality of display units such that each of the plurality of link images is able to be output to a corresponding one of the plurality of display units, the plurality of link images being to be displayed in a linked manner across the plurality of display units; and a plurality of image output units each of which is configured to output a respective one of the plurality of link images to the corresponding one of the plurality of display units after the plurality of link images are subject to the preprocessing by the single display processing unit.

10 Claims, 5 Drawing Sheets

(51) Int. Cl.
    *G06T 3/60*     (2006.01)
    *G06T 13/00*    (2011.01)

(52) U.S. Cl.
    CPC .... *B60K 2370/152* (2019.05); *B60K 2370/52* (2019.05)

(56) References Cited

U.S. PATENT DOCUMENTS

2015/0346922 A1*  12/2015  Robertson ............... G06F 17/11
                                                        715/765
2018/0260184 A1*  9/2018   Hardacker ............. G09G 5/005

FOREIGN PATENT DOCUMENTS

| | | |
|---|---|---|
| JP | 2013-024948 A | 2/2013 |
| JP | 2013-205738 A | 10/2013 |
| JP | 2013-213859 A | 10/2013 |
| JP | 2017-190995 A | 10/2017 |

* cited by examiner

FIG. 3
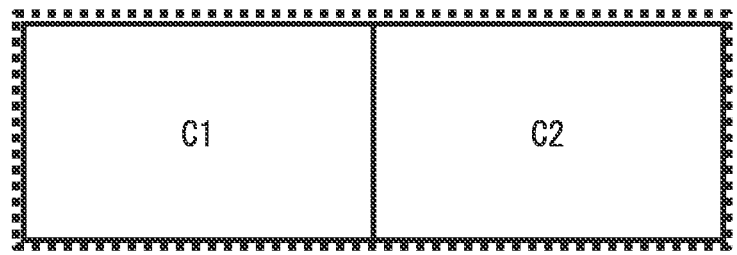
FIG. 4
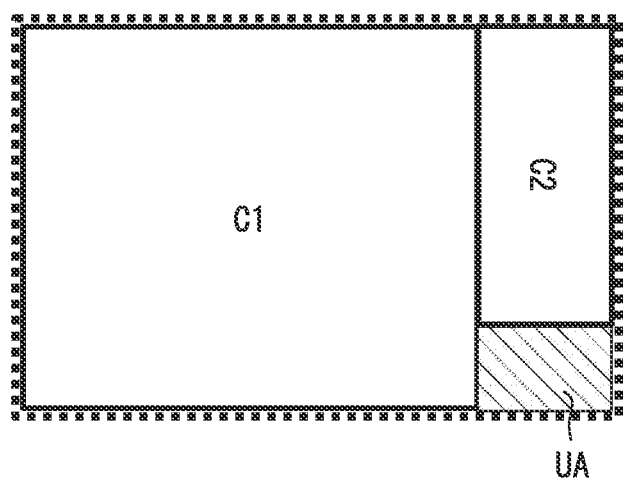
FIG. 5   COMPARATIVE EXAMPLE
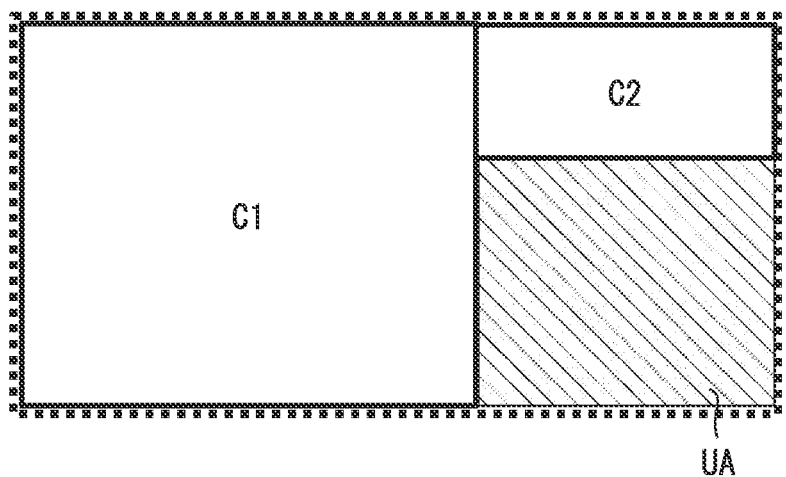

FIG. 6
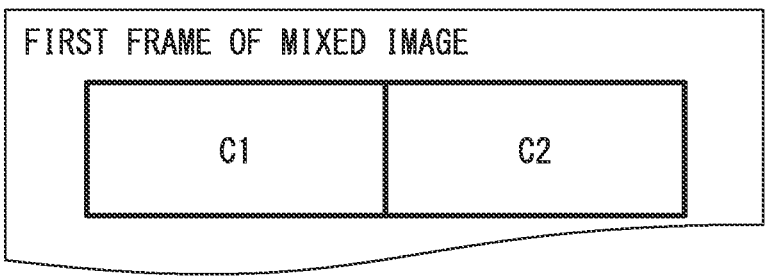
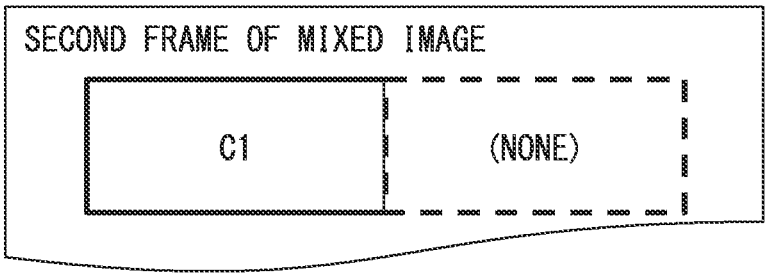
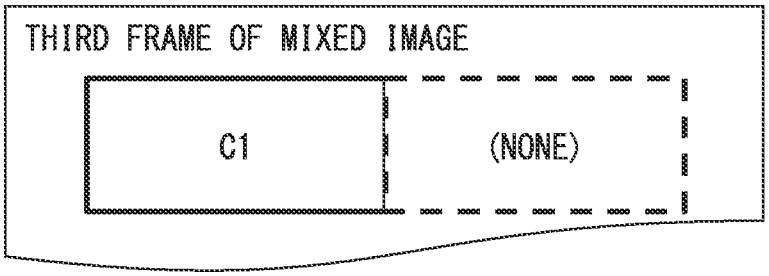
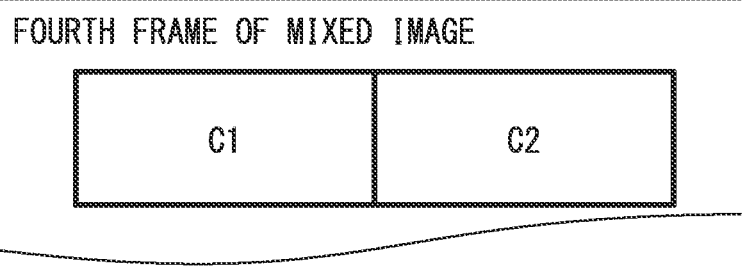

VEHICLE CONTROLLER, VEHICLE DISPLAY SYSTEM, AND VEHICLE DISPLAY CONTROL METHOD USING A SINGLE DISPLAY PROCESSING UNIT FOR DISPLAYING LINK IMAGES

CROSS REFERENCE TO RELATED APPLICATIONS

This application is a continuation application of International Patent Application No. PCT/JP2020/018897 filed on May 12, 2020, which designated the U.S. and claims the benefit of priority from Japanese Patent Application No. 2019-104769 filed on Jun. 4, 2019. The entire disclosure of all of the above application is incorporated herein by reference.

TECHNICAL FIELD

The present disclosure relates to a vehicle controller, a vehicle display system, and a vehicle display control method.

BACKGROUND ART

There has been a technique for displaying an opening animation on a display unit disposed in a vehicle interior at the start of an in-vehicle system. A plurality of display units are provided in the vehicle interior in recent years. The display units provided in the vehicle interior are individually subject to preprocessing for display by respective corresponding display controllers.

SUMMARY

One aspect of the present disclosure is a vehicle controller that is configured to control a plurality of display units disposed in a vehicle interior. The vehicle controller includes: a single display processing unit that is configured to perform preprocessing on a plurality of link images for the plurality of display units such that each of the plurality of link images is able to be output to a corresponding one of the plurality of display units, the plurality of link images being to be displayed in a linked manner across the plurality of display units; and a plurality of image output units each of which is configured to output a respective one of the plurality of link images to the corresponding one of the plurality of display units after the plurality of link images are subject to the preprocessing by the single display processing unit.

The single display processing unit is configured to perform the preprocessing on the plurality of link images by performing the preprocessing on a mixed image formed by synthesizing the plurality of link images into a frame. Each of the plurality of image output units is configured to: specify a region of the respective one of the plurality of link images in the mixed image that is subject to the preprocessing by the single display processing unit; and output the respective one of the plurality of link images to the corresponding one of the plurality of display units. When the plurality of link images have different screen resolutions, the mixed image is formed such that the mixed image in the frame has a minimum size by rotating at least one of the plurality of link images.

BRIEF DESCRIPTION OF DRAWINGS

The above and other objects, features and advantages of the present disclosure will become more apparent from the following detailed description made with reference to the accompanying drawings.

FIG. 3 illustrates an example of a mixed image formed of link images synthesized in one frame.

FIG. 4 illustrates an example of an arrangement of link images having different screen resolutions in a mixed image.

FIG. 5 illustrates another example of an arrangement of link images having different screen resolutions in a mixed image.

FIG. 6 is a schematic illustration of an example of composition of a mixed image for each frame in case where CID 20 and meter MID 30 have different frame rates.

FIG. 8 illustrates an example of a schematic configuration of an integrated ECU 10a.

DESCRIPTION OF EMBODIMENTS

Figure 1:
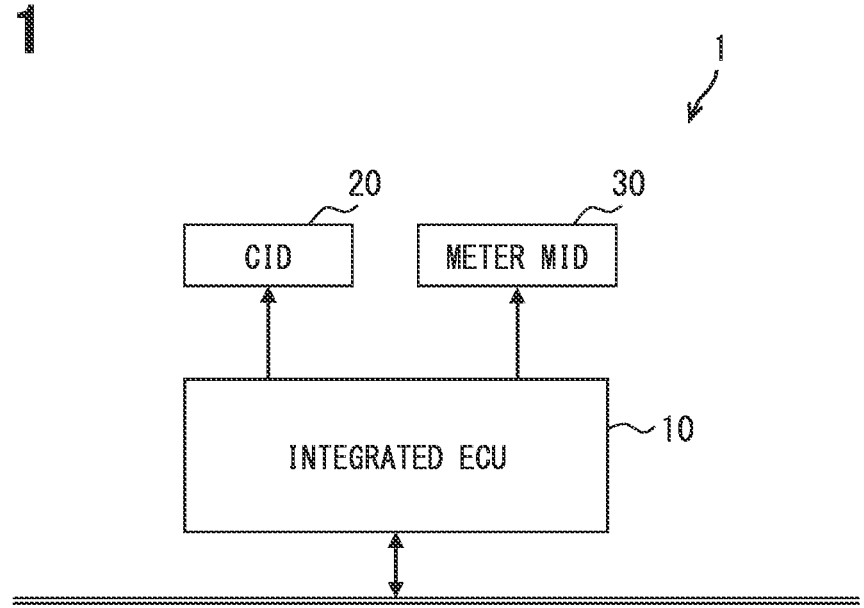
FIG. 1 illustrates an example of a schematic configuration of a vehicle display system 1.

To begin with, a relevant technology will be described only for understanding the following embodiments.

As an increased number of display units have been provided in a vehicle interior, it is increasingly required to perform displaying in a linked manner between a plurality of display units. In the existing techniques, however, processing for displaying is individually performed by respective corresponding display controllers. Hence, in the event that one or some of the controllers must provide a resource for processing other than displaying, the controller is reduced in processing speed, leading to deviation in timing of display to be linked between the display units. This allows a user to feel strangeness in linked display between the display units. In particular, in case of animation display, a user more easily feels strangeness in the deviation in timing of display to be linked between the display units.

One objective of the present disclosure is to provide a vehicle controller, a vehicle display system, and a vehicle display control method, which each allow a user to be less likely to feel strangeness due to deviation in display timing between a plurality of display units provided in a vehicle interior in case where linked display is performed between the display units.

As described above, according to the one aspect of the present disclosure, a vehicle controller is configured to control a plurality of display units disposed in a vehicle interior. The vehicle controller includes: a single display processing unit that is configured to perform preprocessing on a plurality of link images for the plurality of display units such that each of the plurality of link images is able to be output to a corresponding one of the plurality of display units, the plurality of link images being to be displayed in a linked manner across the plurality of display units; and a plurality of image output units each of which is configured to output a respective one of the plurality of link images to the corresponding one of the plurality of display units after the plurality of link images are subject to the preprocessing by the single display processing unit.

The single display processing unit is configured to perform the preprocessing on the plurality of link images by performing the preprocessing on a mixed image formed by synthesizing the plurality of link images into a frame. Each of the plurality of image output units is configured to: specify a region of the respective one of the plurality of link images in the mixed image that is subject to the preprocessing by the single display processing unit; and output the respective one of the plurality of link images to the corresponding one of the plurality of display units. When the plurality of link images have different screen resolutions, the mixed image is formed such that the mixed image in the frame has a minimum size by rotating at least one of the plurality of link images.

According to a second aspect of the present disclosure, a vehicle controller is configured to control a plurality of display units disposed in a vehicle interior. The vehicle controller includes: a single display processing unit that is configured to perform preprocessing on a plurality of link images for the plurality of display units such that each of the plurality of link images is able to be output to a corresponding one of the plurality of display units, the plurality of link images being to be displayed in a linked manner across the plurality of display units; and a plurality of image output units each of which is configured to output a respective one of the plurality of link images to the corresponding one of the plurality of display units after the plurality of link images are subject to the preprocessing by the single display processing unit. The single display processing unit is configured to perform the preprocessing on the plurality of link images by performing the preprocessing on a mixed image formed by synthesizing the plurality of link images into a frame, and each of the plurality of image output units is configured to: specify a region of the respective one of the plurality of link images in the mixed image that is subject to the preprocessing by the single display processing unit; and output the respective one of the plurality of link images to the corresponding one of the plurality of display units. The mixed image is formed by synthesizing the plurality of images in each of frames that are displayed in a chronological order to provide an animation. The single display processing unit is configured to sequentially perform, for each of the frames, the preprocessing on the mixed image. Each time the single display processing unit sequentially performs the preprocessing, each of the plurality of image output units is configured to: specify a region of the respective one of the plurality of link images in the mixed image that is subject to the preprocessing; and sequentially output the respective one of the plurality of link images to the corresponding one of the plurality of display units. When each of the plurality of display units have a different frame rate, which is a number of images per unit time for the plurality of link images when displaying the animation, the mixed image is formed by synthesizing the plurality of link images at a frame rate corresponding to a highest frame rate of a first display unit among the plurality of display units that corresponds to a first link image of the plurality of link images. A second link image of the plurality of link images corresponding to a second display unit of the plurality of display units having a lower frame rate than the highest frame rate is synthesized with the first link image in every $N^{th}$ frame, wherein N is a number according to a ratio of the highest frame rate to the lower frame rate, whereas the second link image is synthesized as empty data with the first link image in other frames. A first image output unit of the plurality of image output units corresponding to the first display unit is configured to, each time the single display processing unit sequentially performs the preprocessing: specify a region of the first link image in the mixed image that is subject to the preprocessing; and sequentially output the first link image to the first display unit. A second image output unit of the plurality of image output units corresponding to the second display unit is configured to, in every $N^{th}$ frame: specify a region of the second link image in the mixed image that is subject to the preprocessing; and sequentially output the second link image to the second display unit.

According to a third aspect of the present disclosure, a vehicle control method is for controlling a plurality of display units disposed in a vehicle interior. The method comprising: performing, with a single processing unit, preprocessing on a plurality of link images for the plurality of display units such that each of the plurality of link images is able to be output to a corresponding one of the plurality of display units, the plurality of link images being to be displayed in a linked manner across the plurality of display units; and outputting, with a plurality of display output units, each of the plurality of link images to the corresponding one of the plurality of display units after performing the preprocessing on the plurality of link images by the single display processing unit. The method further comprises: performing, with the single processing unit, the preprocessing on the plurality of link images by performing the preprocessing on a mixed image formed by synthesizing the plurality of link images into a frame; specifying, with each of the plurality of image output units, a region of the respective one of the plurality of link images in the mixed image that is subject to the preprocessing by the single display processing unit; outputting, with each of the plurality of image output units, the respective one of the plurality of link images to the corresponding one of the plurality of display units; and when the plurality of link images have different screen resolutions, forming the mixed image such that the mixed image in the frame has a minimum size by rotating at least one of the plurality of link images.

According to a fourth aspect of the present disclosure, a vehicle control method is for controlling a plurality of display units disposed in a vehicle interior. The method includes: performing, with a single processing unit, preprocessing on a plurality of link images for the plurality of display units such that each of the plurality of link images is able to be output to a corresponding one of the plurality of display units, the plurality of link images being to be displayed in a linked manner across the plurality of display units; and outputting, with a plurality of display output units, each of the plurality of link images to the corresponding one of the plurality of display units after performing the preprocessing on the plurality of link images by the single display processing unit. The method further includes: performing, with the single processing unit, the preprocessing on the plurality of link images by performing the preprocessing on a mixed image formed by synthesizing the plurality of link images into a frame; specifying, with each of the plurality of image output units, a region of the respective one of the plurality of link images in the mixed image that is subject to the preprocessing by the single display processing unit; and outputting, with each of the plurality of image output units, the respective one of the plurality of link images to the corresponding one of the plurality of display units. The method further includes: forming the mixed image by synthesizing the plurality of images in each of frames that are displayed in a chronological order to provide an animation; sequentially performing, for each of the frames with the single display processing unit, the preprocessing on the mixed image; each time sequentially performing the preprocessing, specifying, with each of the plurality of image output units, a region of the respective one of the plurality of link images in the mixed image that is subject to the preprocessing; and sequentially outputting, with each of the plurality of image output units, the respective one of the plurality of link images to the corresponding one of the plurality of display units. The method further includes: when each of the plurality of display units have a different frame rate, which is a number of images per unit time for the plurality of link images when displaying the animation, forming the mixed image by synthesizing the plurality of link images at a frame rate corresponding to a highest frame rate of a first display unit among the plurality of display units that corresponds to a first link image of the plurality of link images; synthesizing a second link image of the plurality of link images corresponding to a second display unit of the plurality of display units having a lower frame rate than the highest frame rate with the first link image in every $N^{th}$ frame, wherein N is a number according to a ratio of the highest frame rate to the lower frame rate, whereas synthesizing the second link image as empty data with the first link image in other frames; each time sequentially performing the preprocessing, specifying, with a first image output unit of the plurality of image output units corresponding to the first display unit, a region of the first link image in the mixed image that is subject to the preprocessing; and sequentially outputting, with the first image output unit, the first link image to the first display unit; in every $N^{th}$ frame, specifying, with a second image output unit of the plurality of image output units corresponding to the second display unit, a region of the second link image in the mixed image that is subject to the preprocessing; and sequentially outputting, with the second image output unit, the second link image to the second display unit.

According to the controllers and the control methods, the single display processing unit performs the preprocessing on the link images for the display units. This makes it possible to reduce deviation between timings of preprocessing on the link images for the respective display units as compared with a case where preprocessing is individually performed by a controller for each of the display units. Hence, when the image output units output the link images for the respective display units to the corresponding display units, deviation in output timing can also be accordingly reduced since preprocessing is performed by the single display processing unit. This also makes it possible to reduce deviation in display timing between the link images for the respective display units. As a result, when linked display is performed between a plurality of display units provided in a vehicle interior, it is possible to allow a user to be less likely to feel strangeness due to deviation in display timing between the display units.

In another aspect of the present disclosure, the vehicle display system of the disclosure includes a plurality of display units provided in a vehicle interior, and the above-described vehicle controller that controls display by each of the display units.

Accordingly, since the system includes the vehicle controller, when linked display is performed between the display units provided in the vehicle interior, it is possible to allow a user to be less likely to feel strangeness due to deviation in display timing between the display units.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

(First Embodiment)

(Schematic configuration of a vehicle display system 1)

The first embodiment is now described with reference to drawings. First, a vehicle display system 1 is described with reference to FIG. 1. The vehicle display system 1 is used in a vehicle. Hereinafter, description is given with an example where the vehicle display system 1 is used in an automobile. As illustrated in FIG. 1, the vehicle display system 1 includes an integrated ECU 10, a center information display (hereinafter, abbreviated as CID) 20, and a meter multi-information display (hereinafter, abbreviated as meter MID) 30.

The CID 20 is a display unit provided in a center cluster in a vehicle interior. A display unit that can draw an image may be used as the CID 20. A display unit such as a liquid crystal display or an organic EL display can be used as the CID 20. In one example, the CID 20 mainly displays information of multimedia functions, such as navigation information and audio information. The navigation information relates to navigation functions, including, for example, routing assistance images. The audio information includes, for example, images on operation of audio equipment. The CID 20 also displays other information, such as opening display information and air conditioning information. The opening display information includes, for example, an image on opening performance (hereinafter, referred to as opening image) at vehicle start. The air conditioning information includes, for example, an image on operation of air-conditioning equipment.

The meter MID 30 is a display unit provided in front of a driver seat in the vehicle interior. In one example, the meter MID 30 may be configured to be provided on a meter panel. A display unit that can draw an image may be used as the meter MID 30. A display unit such as a liquid crystal display or an organic EL display can be used as the meter MID 30. In one example, the meter MID 30 mainly displays information of safety and security functions, such as meter information. The meter information includes, for example, an image on meter display. The meter MID 30 further displays opening display information and simplified navigation information. The opening display information includes, for example, the above-described opening image, and the opening image displayed by the meter MID 30 is not the same as the opening image displayed by the CID 20. The simplified navigation information is more simplified than the navigation information displayed by the CID 20, for example, a simplified routing assistance image.

The CID 20 and the meter MID 30 may be configured to have the same screen resolution. In the first embodiment, however, the following description is given assuming that the CID 20 and the meter MID 30 have different screen resolutions. The screen resolution means the number of pixels displayed by the display unit and is represented by the number of pixels in respective horizontal and vertical directions. In the following description, it is assumed that the number of pixels is larger in the screen resolution of the CID 20 than in the screen resolution of the meter MID 30.

Although the CID 20 and the meter MID 30 may be configured to have the same frame rate for animation display, the first embodiment is described below assuming that the CID 20 and the meter MID 30 have different frame rates. The frame rate means the number of images per unit time for displaying an animation. In an exemplary configuration, the frame rate may be expressed by frames per second (fps) indicating the number of images per second. In the following, description is given with an exemplary case where the frame rate of the CID 20 is three times larger than the frame rate of the meter MID 30. The CID 20 corresponds to a first display unit, and the meter MID 30 corresponds to a second display unit.

The integrated ECU 10 is an electronic control unit (ECU) integrating a function of controlling the CID 20 and a function of controlling the meter MID 30. The integrated ECU 10 is connected to both the CID 20 and the meter MID 30, and draws various images on the CID 20 and the meter MID 30 for display. The integrated ECU 10 is also connected to in-vehicle LAN and receives information from, for example, a sensor and another ECU connected to the in-vehicle LAN. The images drawn by the integrated ECU 10 on the CID 20 and the meter MID 30 correspond to output information from the integrated ECU 10. The information received by the integrated ECU 10 via the in-vehicle LAN corresponds to input information to the integrated ECU 10. The input information includes vehicle information such as vehicle speed and travel distance, video information of a digital television, and smartphone-cooperating information for cooperating with a smartphone. The integrated ECU 10 is configured to collectively manage the input information and the output information, and can freely rearrange input resources and output destinations of various information.

The integrated ECU 10 includes a microcomputer, as a main component, having, for example, a processor, a memory, I/O, and a bus connecting between such elements. The integrated ECU 10 executes control programs stored in the memory to perform various processing on image display to the CID 20 and the meter MID 30. Specifically, in the first embodiment, the integrated ECU 10 allows the CID 20 and the meter MID 30 to display images in a linked manner therebetween. The integrated ECU 10 corresponds to a vehicle controller. The memory described herein is a non-transitory tangible storage medium that non-transitorily stores a computer-readable program and data. The non-transitory tangible storage medium is realized by a semi-conductor memory or a magnetic disc. The integrated ECU 10 is described in detail below.

(Schematic configuration of the integrated ECU 10)

Figure 2:
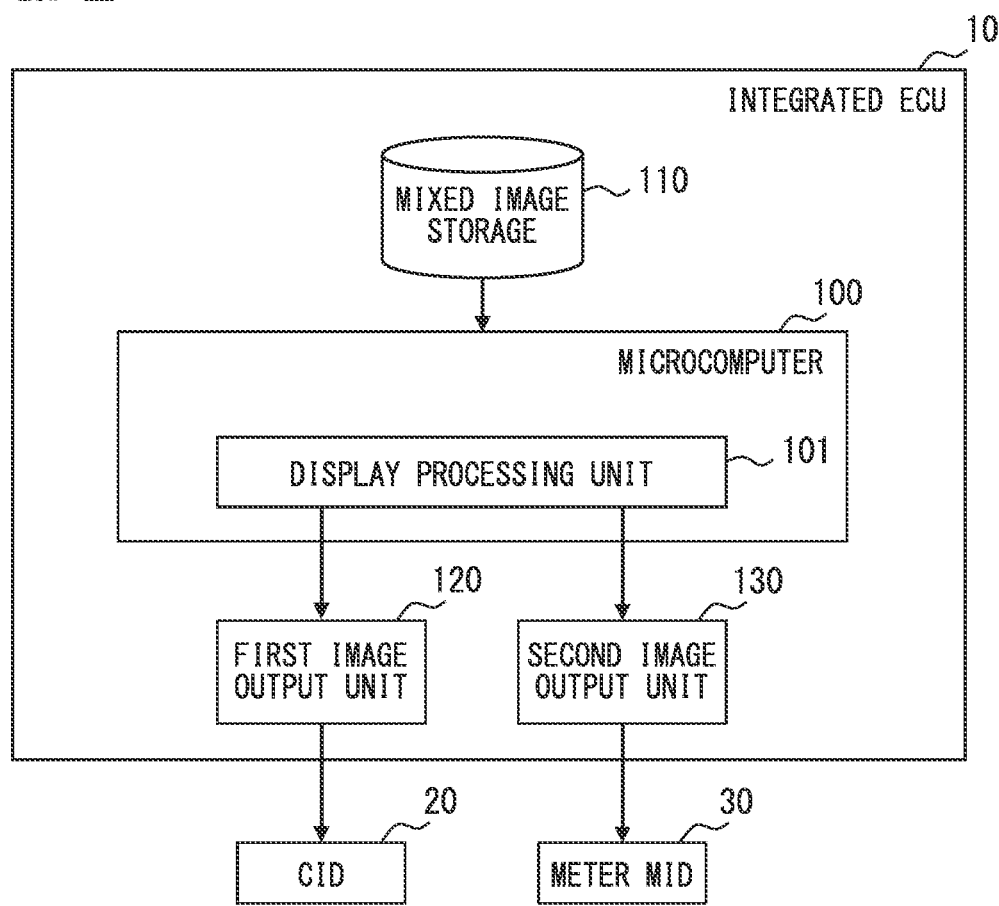
FIG. 2 illustrates an example of a schematic configuration of an integrated electronic control unit (ECU) 10.

A schematic configuration of the integrated ECU 10 is now described with reference to FIG. 2. The schematic configuration illustrated in FIG. 2 shows a structure accommodated in one housing. The integrated ECU 10 includes a microcomputer 100, a mixed image storage 110, a first image output unit 120, and a second image output unit 130. Some or all of functions executed by the integrated ECU 10 may be configured in a hardware manner by one or more IC, for example.

The mixed image storage 110 stores an image (hereinafter, referred to as a "mixed image") in which images (hereinafter, referred to as "link images") for the respective display units are synthesized in one frame. The link images are to be displayed in a linked manner across the CID 20 and the meter MID 30. The mixed image storage 110 may be a nonvolatile memory. In the first embodiment, the mixed image storage 110 stores, in advance, the link images for the CID 20 and the link images for the meter MID 30 that have been synthesized with each other.

The link described herein refers to allowing display objects to look to move synchronously between the CID 20 and the meter MID 30. In one example, the link includes allowing a display object to be displayed to look to gradually move from one to the other between the CID 20 and the meter MID 30. The link may mean allowing a display object to look to gradually expand from one to the other between the CID 20 and the meter MID 30. Alternatively, the link may mean allowing one object to look changed to a user in response to a change in the other object between the CID 20 and the meter MID 30. The link described herein may mean, but may not be limited to, performing deformation or rotation of the same image between the CID 20 and the meter MID 30.

In the first embodiment, the link images are still images in chronological order for displaying an animation. The mixed image storage 110 stores frames of the mixed images in chronological order to display the animation. In the following, description is given with an exemplary case where opening images are displayed as an animation in a linked manner between the CID 20 and the meter MID 30. Hereinafter, the animation of opening images is referred to as opening animation.

In the mixed image, as illustrated in FIG. 3, the link images, which are to be linked with each other, for the CID 20 and the meter MID 30 are synthesized in one frame. C1 in FIG. 3 is the link image for the CID 20. C2 in FIG. 3 is the link image for the meter MID 30. A rectangle shown by a dot line in FIG. 3 indicates a region of one frame. The same holds true for the subsequent drawings. FIG. 3 shows an exemplary case for convenience, in which the link image for the CID 20 and the link image for the meter MID 30 have the same screen resolution.

When a non-display region is set around each link image, the mixed image may be formed such that the link images are arranged and synthesized in one frame with information of the non-display region in between. However, as illustrated in FIG. 3, the link images are preferably arranged and synthesized in one frame without information of the non-display region therebetween in order to increase speed of reading the mixed image from the mixed image storage 110 while the region of one frame is reduced to the utmost.

In the mixed image, when respective link images corresponding to the CID 20 and the meter MID 30 have different screen resolutions, the link images corresponding to the CID 20 and the meter MID 30 are preferably synthesized with each other by rotating one of the link images such that the mixed image in one frame has a minimum size.

In one example, it may be configured that the respective link images for the CID 20 and the meter MID 30 are synthesized in one frame by rotating a first one of the link images having the long side with a smaller number of pixels such that the long side of the first one of the link images is laid along a short side of a second one of the link images having the long side with a larger number of pixels. In a specific example, as illustrated in FIG. 4, the link images are synthesized with each other while the link image for the meter MID 30 is clockwise rotated 90 degrees such that the long side of the link image for the meter MID 30 is laid along the short side of the link image for the CID 20. UA in FIG. 4 indicates an unused region, in which no link image is disposed, in one frame. The same holds true for the subsequent drawings. In the example of FIG. 4, the number of pixels of the long side of the link image for the CID 20 is larger than that of the link image for the meter MID 30.

Accordingly, as illustrated in FIG. 5, compared with a case where the link images corresponding to the CID 20 and the meter MID 30 are simply arranged and synthesized such that the respective short sides of the link images are laid along each other, the unused region, in which no link image is disposed, can be reduced in one frame. Hence, when a mixed image is read from the mixed image storage 110, useless reading of the unused region is reduced, making it possible to increase speed of reading the mixed image.

When the CID 20 and the meter MID 30 have different frame rates, the mixed image is preferably formed at a frame rate corresponding to the highest frame rate of one of the display units. In the example of the first embodiment, since the frame rate of the CID 20 is three times larger than that of the meter MID 30, the mixed image is composed for each frame, the frame number of which corresponds to the frame rate of the CID 20.

The link image for the meter MID 30 having a lower frame rate may be synthesized with the link image for the CID 20 to form a mixed image in every $N^{th}$ frame. N corresponds to a ratio of the highest frame rate of the CID 20 to the lower frame rate of the MID 30. In the example of the first embodiment, since the frame rate of the CID 20 is three times larger than that of the meter MID 30, as illustrated in FIG. 6, the link image for the meter MID 30 is synthesized with the link image for the CID 20 at every three frames to form a mixed image. On the other hand, as illustrated in FIG. 6, for the rest of the frames, the link image for the meter MID 30 is synthesized as empty data to form a mixed image. In other words, a mixed image is formed only with the link image for the CID 20 without the link image for the meter MID 30. The region of one frame may be equally fixed even if the link image for the meter MID 30 is synthesized.

Alternatively, it may also be configured that the link image for the meter MID 30 may be synthesized with the link image for the CID 20 for all frames.

The microcomputer 100 includes a display processing unit 101 as a function block. The display processing unit 101 performs preprocessing on the link images, which are to be displayed in a linked manner between the CID 20 and the meter MID 30, to form each of the link images into information that can be output to the display unit. The display processing unit 101 is common to the CID 20 and the meter MID 30. This can be rephrased as "a microcomputer performing the preprocessing is shared by a plurality of display units".

The display processing unit 101 performs preprocessing on the mixed image formed by combining the respective link images for the CID 20 and the meter MID 30 in one frame, thereby performs preprocessing on the respective link images for the CID 20 and the meter MID 30.

The preprocessing includes reading the mixed image stored in the mixed image storage 110 and developing the mixed image in the memory of the microcomputer 100. The memory is a graphic memory, for example. The preprocessing further includes giving, to the first image output unit 120 and the second image output unit 130, output commands to output (i.e., draw) link images corresponding to the respective display units in the mixed image developed in the graphic memory. The order of giving the output commands from the display processing unit 101 to the first image output unit 120 and the second image output unit 130 corresponds to priority of the order of outputting the first image output unit 120 and the second image output unit 130 to the display units.

In the first embodiment, the display processing unit 101 is configured to give the output commands both the first image output unit 120 and the second image output unit 130 at the same time. In other words, the priority of output from the first image output unit 120 to the CID 20 is set to be equal to the priority of output from the second image output unit 130 to the meter MID 30. Accordingly, the link image for the CID 20 and the link image for the meter MID 30 contained in the mixed image are output from the first image output unit 120 and the second image output unit 130, respectively, to the respective corresponding display units at substantially the same time. Hence, when linked display is performed between a plurality of display units provided in a vehicle interior, it is possible to allow a user to be less likely to feel strangeness due to deviation in display timing between the display units.

The display processing unit 101 sequentially performs, for each frame in chronological order, the preprocessing on the mixed images for the respective frames stored in the chronological order in the mixed image storage 110 to display an animation.

It may be configured that images, which need not be displayed in the linked manner between the CID 20 and the meter MID 30, are processed by independent display processing units, which are different from the display processing unit 101, for the respective CID 20 and meter MID 30.

The first image output unit 120 outputs the link image for the CID 20, which has been subjected to preprocessing by the display processing unit 101, to the CID 20. The first image output unit 120 specifies a region of the link image corresponding to the CID 20 in the mixed image that is subject to the preprocessing by the display processing unit 101, and outputs the link image for the CID 20 to the CID 20. It may be designed that the first image output unit 120 can specify the region of the link image corresponding to the CID 20 by having, in advance, information on the area of the link image for the CID 20 in a frame region, for example. In addition, it may be designed that the first image output unit 120 can allow the link image for the CID 20 to be displayed in a direction before being rotated even if the link image has been rotated and combined in the mixed image by beforehand having a correspondence relationship between coordinates of the frame region and coordinates of a screen of the CID 20, for example. For example, an integrated circuit (IC) may be used as the first image output unit 120.

The second image output unit 130 outputs the link image for the meter MID 30, which has been subject to preprocessing by the display processing unit 101, to the meter MID 30. The second image output unit 130 specifies a region of the link image corresponding to the meter MID 30 in the mixed image that is subject to the preprocessing by the display processing unit 101, and outputs the link image for the meter MID 30 to the meter MID 30. It may be designed that the second image output unit 130 can specify the region of the link image corresponding to the meter MID 30 by having, in advance, information on the area of the link image for the meter MID 30 in a frame region, for example. In addition, it may be designed that the second image output unit 130 can allow the link image for the meter MID 30 to be displayed in a direction before being rotated even if the link image has been rotated and combined in the mixed image by beforehand having a correspondence relationship between coordinates of the frame region and coordinates of a screen of the meter MID 30, for example. For example, IC may be used as the second image output unit 130.

Whenever the display processing unit 101 sequentially performs preprocessing on the mixed image for each frame, the first image output unit 120 and the second image output unit 130 specify regions of respective link images corresponding to the CID 20 and the meter MID 30, and sequentially output the respective link images for the CID 20 and the meter MID 30 to the CID 20 and the meter MID 30. As a result, the CID 20 and the meter MID 30 each display an animation. Hence, when linked animation display is performed between a plurality of display units provided in a vehicle interior, it is possible to allow a user to be less likely to feel strangeness due to deviation in display timing between the display units.

When no link image for the display unit, which is an output destination of the relevant image output unit, is contained in the mixed image to be subjected to the preprocessing, the first image output unit 120 and the second image output unit 130 each do not output the link image. For example, the following operation may be performed.

Whenever the display processing unit 101 sequentially performs preprocessing, the first image output unit 120, the output destination of which is the CID 20 having the highest frame rate, may specify a region of the link image corresponding to the CID 20 in the mixed image to be subjected to the preprocessing, and may sequentially output the link image to the CID 20.

On the other hand, the second image output unit 130, the output destination of which is the meter MID 30 having a lower frame rate, may specify a region of the link image corresponding to the meter MID 30 in the mixed image to be subject to the preprocessing at every $N^{th}$ frame. N corresponds to a frame rate ratio of the CID 20 to the meter MID 30. Then, the second image output unit 130 may sequentially output the link image to the meter MID 30. In an example of the first embodiment, the second image output unit 130 specifies the region of the link image corresponding to the meter MID 30 in the mixed image to be subject to the preprocessing at every three frames, and sequentially outputs the link image to the meter MID 30. For example, while the second image output unit 130 receives the above-described output command from the display processing unit 101 for each frame, it may follow the output command at every frame having a frame number corresponding to a frame rate ratio of the meter MID 30 to the CID 20.

According to the above configuration, when a frame rate is different for each of a plurality of display units provided in a vehicle interior, it is possible to allow animation display linked between the display units to be performed with deviation in display timing being reduced while omitting useless output processing on a link image that cannot be displayed by a display unit.

(Linked Display Control-Related Processing by the Integrated ECU)

Figure 7:
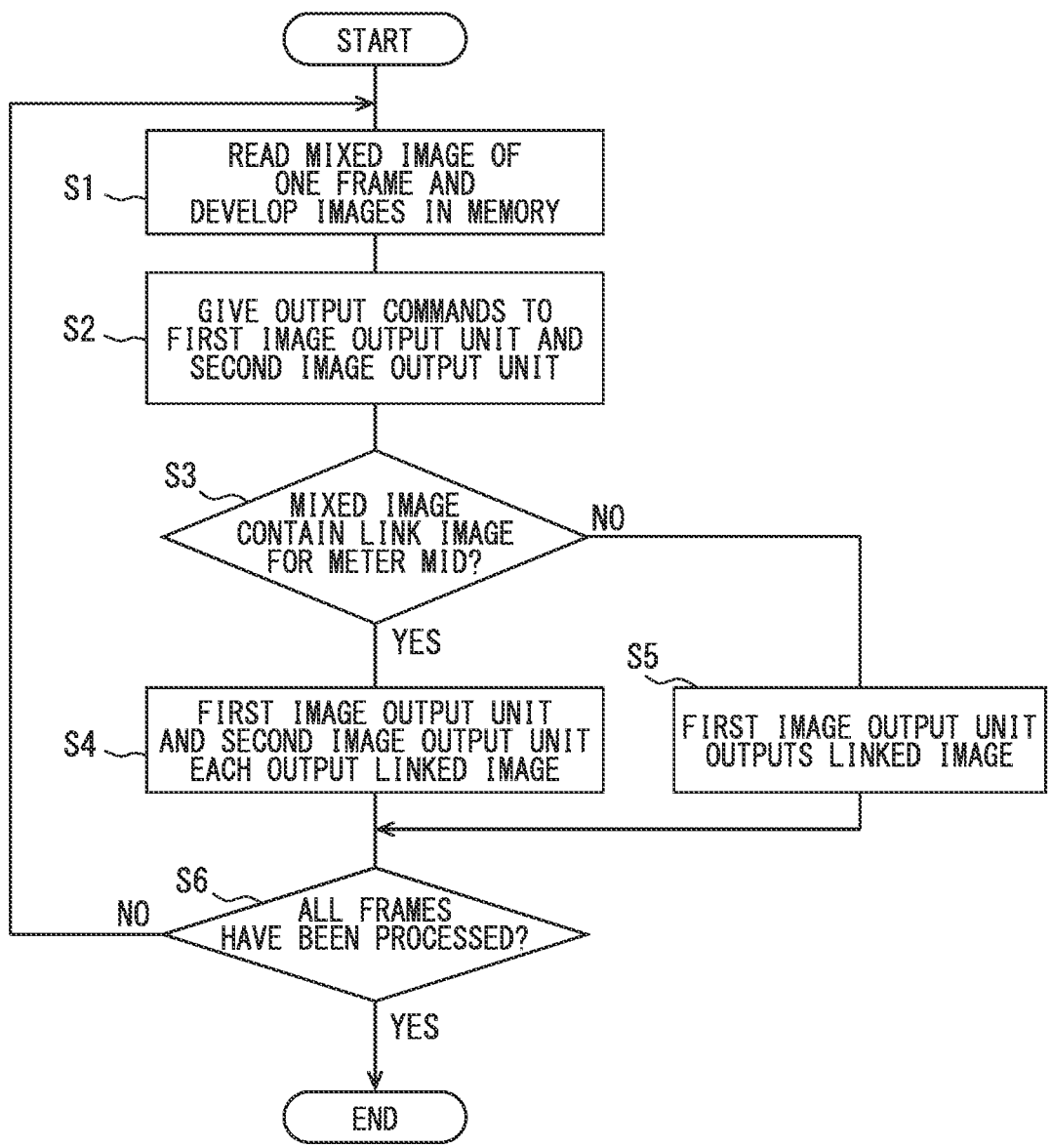
FIG. 7 is a flowchart of an example of a procedure of linked display control-related processing by the integrated ECU 10.

Description is now given with reference to a flowchart of FIG. 7 on an example of a procedure of processing (hereinafter, referred to as linked display control-related processing), which relates to display control of images linked between the CID 20 and the meter MID 30, by the integrated ECU 10. The description is given with reference to FIG. 7 with an exemplary case where an opening animation is displayed. The flowchart of FIG. 7 may be started upon detection of a startup trigger. The startup trigger may be, for example, timing at which a switch is turned on to start an internal combustion engine or a motor generator of an automobile.

At step S1, the display processing unit 101 reads, in chronological order, a mixed image of one frame in mixed images of a plurality of frames for an opening animation stored in the mixed image storage 110, and develops the images in the memory of the microcomputer 100. At step S2, the display processing unit 101 gives the output commands to the first image output unit 120 and the second image output unit 130 at the same time.

At step S3, when the mixed image read in S1 contains a link image for the meter MID 30 (YES in S3), the process proceeds to step 34. On the other hand, when the mixed image read in S1 contains no link image for the meter MID 30 (NO in S3), the procedure is passed to step S4. It may be configured that such case classification is made depending on which frame is read in S1 from start of frame reading. In the example of the first embodiment, the mixed image contains the link image for the meter MID 30 at every three frames after the first frame.

At step 34, the first image output unit 120 specifies a region of a link image corresponding to the CID 20 in the mixed image that is subject to the preprocessing in S1 to S2, and outputs the link image for the CID 20 to the CID 20, and then the process proceeds to step S6. The second image output unit 130 specifies a region of a link image corresponding to the meter MID 30 in the mixed image that is subject to the preprocessing in S1 to S2, and outputs the link image for the meter MID 30 to the meter MID 30. Since the display processing unit 101 gives the output command to both the first image output unit 120 and the second image output unit 130 at the same time, the first image output unit 120 and the second image output unit 130 perform output processing at substantially the same timing.

At step S5, the first image output unit 120 specifies a region of a link image corresponding to the CID 20 in the mixed image subjected to the preprocessing in S1 to S2, and outputs the link image for the CID 20 to the CID 20, and then the procedure is passed to step S6. In step S5, the second image output unit 130 performs no output processing.

At step S6, if all the frames for the opening animation have been processed (YES in S6), the linked display control-related processing is finished. If some frame remains unprocessed (NO in S6), the procedure is returned to step S1, and the residual frames are processed.

Although description has been given herein with an exemplary case where an opening animation is displayed, the case is not necessarily so limited. The disclosure may be applied to a case where an animation other than the opening animation is displayed.

(Summary of the First Embodiment)

According to the configuration of the first embodiment, the common display processing unit 101 performs the preprocessing on the link image for the CID 20 and the link image for the meter MID 30, which are displayed in a linked manner between the CID 20 and the meter MID 30. Thus, it is possible to reduce deviation in timing of preprocessing on the respective link images between the CID 20 and the meter MID 30 as compared with a case where preprocessing is performed by a controller for the CID 20 and a controller for the meter MID 30 separately. In addition, since preprocessing is performed on the mixed image, in which the link image for the CID 20 and the link image for the meter MID 30 to be linked to each other are combined in one frame, it is possible to more easily reduce deviation between timings of preprocessing on the respective link images.

Further, since the display processing unit 101 gives the output command to both the first image output unit 120 and the second image output unit 130 at the same time, it is also possible to reduce deviation between output of the link image for the CID 20 and output of the link image for the meter MID 30, which are to be linked to each other, by the first image output unit 120 and the second image output unit 130, respectively. This also makes it possible to reduce deviation in display timing between the respective link images for the CID 20 and the meter MID 30. As a result, when linked display is performed between a plurality of display units provided in a vehicle interior, it is possible to allow a user to be less likely to feel strangeness due to deviation in display timing between the display units.

(Second Embodiment)

Although the first embodiment has been described with the configuration where the preprocessing is performed using the mixed image stored in the nonvolatile memory in advance, the configuration is not necessarily so limited. For example, in a usable configuration (hereinafter, referred to as second embodiment), a mixed image is sequentially formed from the respective independent files of link images for preprocessing.

The vehicle display system 1 of the second embodiment is the same as the vehicle display system 1 of the first embodiment except that an integrated ECU 10a is included in place of the integrated ECU 10.

Figure 8:
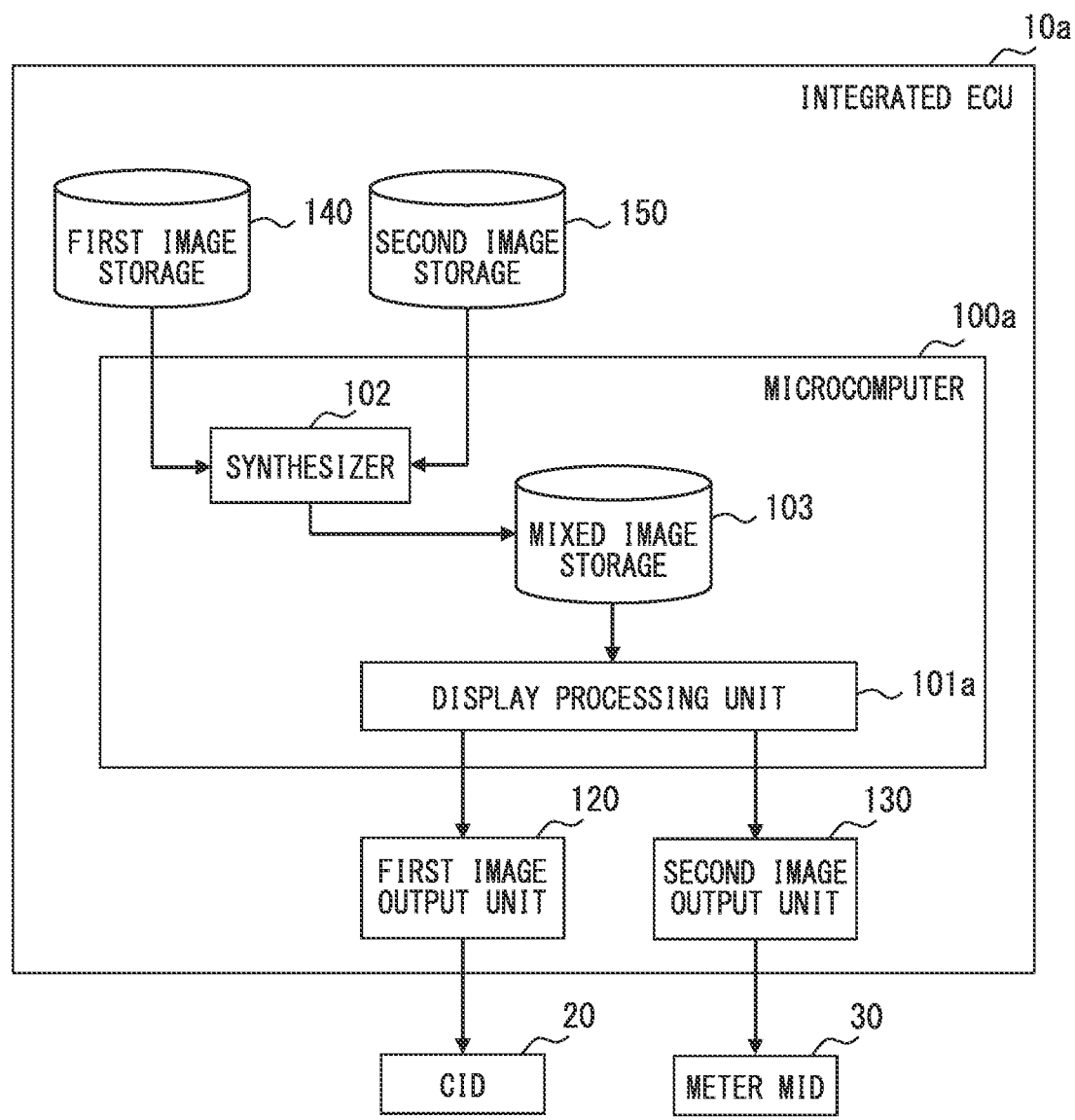

One example of a schematic configuration of the integrated ECU 10a is now described with reference to FIG. 8. As illustrated in FIG. 8, the integrated ECU 10a includes a microcomputer 100a, the first image output unit 120, the second image output unit 130, a first image storage 140, and a second image storage 150. The integrated ECU 10a is the same as the integrated ECU 10 in the first embodiment except that the microcomputer 100a is provided in place of the microcomputer 100, the mixed image storage 110 is not provided, and the first image storage 140 and the second image storage 150 are provided. The integrated ECU 10a also corresponds to the vehicle controller.

The first image storage 140 stores the link image for the CID 20 in the link images displayed in a linked manner between the CID 20 and the meter MID 30. The first image storage 140 stores such link images in chronological order for allowing the CID 20 to display an animation. The first image storage 140 may be a nonvolatile memory. In the second embodiment, the first image storage 140 beforehand stores link images for the CID 20.

The second image storage 150 stores the link image for the meter MID 30 in the link images displayed in a linked manner between the CID 20 and the meter MID 30. The second image storage 150 stores such link images in chronological order for allowing the meter MID 30 to display an animation. The second image storage 150 may be a nonvolatile memory. In the second embodiment, the second image storage 150 beforehand stores link images for the meter MID 30.

The microcomputer 100a includes a display processing unit 101a, a synthesizer 102, and a mixed-image storage 103 as function blocks. Some or all of the function blocks of the microcomputer 100a may be realized by a combination of execution of software by a processor and a hardware component.

The synthesizer 102 synthesizes link images to be linked together, which are images in link images independent for each of a plurality of display units, with each other in one frame to generate a mixed image. The synthesizer 102 sequentially reads the respective link images to be linked together from the first image storage 140 and the second image storage 150, and synthesizes the read link images in one frame to form the mixed image. In one example, it may be configured that the first image storage 140 and the second image storage 150 each beforehand store link images such that the link images are sequentially read along chronological order and thus the link images to be linked together can be read. It may also be configured that the link images to be linked together are mapped to each other with an image file number, for example. The synthesizer 102 sequentially composes a mixed image and stores the mixed image in the mixed-image storage 103. The mixed image storage 103 may be a nonvolatile memory, for example.

In the same way as described in the first embodiment, the synthesizer 102 preferably arranges and synthesizes the link image for the CID 20 and the link image for the meter MID 30 in one frame without information of a non-display region therebetween, In one example, when a non-display region is set around each link image, the link images may be combined while the non-display region is omitted.

In the same way as described in the first embodiment, when the respective link images corresponding to the CID 20 and the meter MID 30 have different screen resolutions, the synthesizer 102 preferably rotates one of the link images corresponding to the CID 20 and the meter MID 30 and combines the link images together to obtain a combination providing the minimum size of the mixed image in one frame. In one example, the respective link images for the CID 20 and the meter MID 30 may be synthesized in one frame while a link image having a long side with a smaller number of pixels is rotated such that the long side with the smaller number of pixels of the link image is laid along a short side of a link image having a long side with a larger number of pixels.

It may be configured that when one of the link images is rotated and combined, for example, the display processing unit 101a outputs information of coordinate transformation due to the rotation in addition to the output command to one image output unit, which is to output the rotated link image, between the first image output unit 120 and the second image output unit 130. This enables the image output unit, which is to output the rotated link image, to use the information of the coordinate transformation due to the rotation to draw the rotated link image while returning a direction of the image into an original direction.

In the same way as described in the first embodiment, when the CID 20 and the meter MID 30 have different frame rates, the synthesizer 102 preferably combines the link images together for each frame having a frame number corresponding to the frame rate of the display unit having the highest frame rate. It may be configured that the link image for the meter MID 30 having a lower frame rate is combined with the link image for the CID 20 having the highest frame rate for each frame having a frame number corresponding to a frame rate ratio of the meter MID 30 to the CID 20. For the rest of the frames, it may be configured that the link image for the meter MID 30 is combined as empty data.

In such a case, for example, it may be configured that the display processing unit 101a outputs, to the second image output unit 130, information of the frame number corresponding to the frame rate ratio of the meter MID 30 to the CID 20 having the highest frame rate in addition to the output command. This allows the second image output unit 130 to use the information of the frame number corresponding to the frame rate ratio of the meter MID 30 to the CID 20 to perform output processing every such frame number.

The display processing unit 101a is the same as the display processing unit 101 in the first embodiment except that the reading destination of the mixed image is the mixed-image storage 103 instead of the mixed image storage 110.

The configuration of the second embodiment is the same as that of the first embodiment except that the preprocessing is performed while the mixed image is sequentially composed instead of performing the preprocessing using the mixed image beforehand stored in the nonvolatile memory. Thus, as in the first embodiment, according to the configuration of the second embodiment, when linked display is performed between a plurality of display units provided in a vehicle interior, it is possible to allow a user to be less likely to feel unpleasantness due to deviation in display timing between the display units. In addition, according to the configuration of the second embodiment, it is possible to reduce the effort of beforehand composing the mixed image and storing the mixed image in the nonvolatile memory.

(Third Embodiment)

Although a configuration where the vehicle display system 1 includes two display units of the CID 20 and the meter MID 30 has been described in the above embodiments, the configuration is not necessarily so limited. For example, it may be configured that the vehicle display system 1 includes a display unit that is neither the CID 20 nor the meter MID. For example, it may be configured that a head-up display is used in place of the meter MID 30. Further, the vehicle display system 1 may include three or more display units.

When the vehicle display system 1 includes three or more display units, it is also preferable that when the respective link images corresponding to such display units have different screen resolutions, the link images corresponding to the respective display units are synthesized while one or some of the link images is rotated to obtain a combination providing the minimum size of a mixed image in one frame.

(Fourth Embodiment)

Although the above embodiments each have been described with an exemplary case where the link images are still images in chronological order for displaying an animation, the case is not necessarily so limited. For example, the link images may be still images that are not used for an animation to be displayed at the same timing by a plurality of display units. In such a case, it is also possible to allow a user to be less likely to feel strangeness due to deviation in display timing by reducing deviation in display timing between the still images to be displayed at the same timing.

(Fifth Embodiment)

Although a configuration where the priority of output from the first image output unit 120 to the CID 20 is set to be equal to the priority of output from the second image output unit 130 to the meter MID 30 has been described in the above embodiments, the configuration is not necessarily so limited. For example, it may also be configured that no priority is set in output processing between the first image output unit 120 and the second image output unit 130. In such a case, the display processing unit 101 or 101*a* may be configured to successively output the respective output commands to the first image output unit 120 and the second image output unit 130. This also makes it possible to reduce deviation in output of the link image to the display unit between the first image output unit 120 and the second image output unit 130 because of the successive output of the output commands.

(Sixth Embodiment)

Although the above embodiments have been described with the configuration where the display processing unit 101 or 101*a* performs the preprocessing on the mixed image, the configuration is not necessarily so limited. For example, it may also be configured that no mixed image is used. In such a case, for example, the display processing unit 101 or 101*a* may be configured to successively perform preprocessing on the link image for the CID 20 and preprocessing on the link image for the meter MID 30. In such a case, it is also possible to reduce deviation in timing of preprocessing on the respective link images compared with a case where the preprocessing is individually performed by the controller for the CID 20 and the controller for the meter MID 30 because the preprocessing on the link image for the CID 20 and the preprocessing on the link image for the meter MID 30 are successively performed.

The disclosure is not limited to the above-described embodiments, and the embodiments can each be variously modified or altered within the scope described in claims, and any embodiment provided by appropriately combining the technical means disclosed in the respective different embodiments is included in the technical scope of the disclosure. Any controller and the method of the controller may be realized by a special computer configuring a processor programed to execute one or more functions embodied by a computer program. Alternatively, the controller and the method of the controller described in the disclosure may be realized by a special hardware logic. Alternatively, the controller and the method of the controller described in the disclosure may be realized by one or more special computer configured by a combination of a processor to execute a computer program and one or more hardware logic. The computer program may be stored in a form of an instruction to be executed by a computer in a computer-readable, non-transitory tangible storage medium.

The invention claimed is:

1. A vehicle controller that is configured to control a plurality of display units disposed in a vehicle interior, the vehicle controller comprising:
   a single display processing unit that is configured to perform preprocessing on a plurality of link images for the plurality of display units such that each of the plurality of link images is able to be output to a corresponding one of the plurality of display units, the plurality of link images being displayed in a linked manner across the plurality of display units; and
   a plurality of image output units each of which is configured to output a respective one of the plurality of link images to the corresponding one of the plurality of display units after the plurality of link images are subject to the preprocessing by the single display processing unit, wherein
   the single display processing unit is configured to perform the preprocessing on the plurality of link images by performing the preprocessing on a mixed image formed by synthesizing the plurality of link images into a frame,
   each of the plurality of image output units is configured to:
      specify a region of the respective one of the plurality of link images in the mixed image that is subject to the preprocessing by the single display processing unit; and
      output the respective one of the plurality of link images to the corresponding one of the plurality of display units,
   when the plurality of link images has different screen resolutions, the mixed image is formed such that the mixed image in the frame has a minimum size by rotating at least one of the plurality of link images,
   the mixed image is formed by synthesizing the plurality of images in each of frames that are displayed in a chronological order to provide an animation,
   the single display processing unit is configured to sequentially perform, for each of the frames, the preprocessing on the mixed image,
   each time the single display processing unit sequentially performs the preprocessing, each of the plurality of image output units is configured to:
      specify a region of the respective one of the plurality of link images in the mixed image that is subject to the preprocessing; and sequentially output the respective one of the plurality of link images to the corresponding one of the plurality of display units, when each of the plurality of display units has a different frame rate, which is a number of images per unit time for the plurality of link images when displaying the animation, the mixed image is formed by synthesizing the plurality of link images at a frame rate corresponding to a highest frame rate of a first display unit among the plurality of display units that corresponds to a first link image of the plurality of link images, a second link image of the plurality of link images corresponding to a second display unit of the plurality of display units having a lower frame rate than the highest frame rate is synthesized with the first link image in every $N^{th}$ frame, wherein N is a number according to a ratio of the highest frame rate to the lower frame rate, whereas the second link image is synthesized as empty data with the first link image in other frames, a first image output unit of the plurality of image output units corresponding to the first display unit is configured to, each time the single display processing unit sequentially performs the preprocessing:

specify a region of the first link image in the mixed image that is subject to the preprocessing; and sequentially output the first link image to the first display unit, and a second image output unit of the plurality of image output units corresponding to the second display unit is configured to, in every $N^{th}$ frame:

specify a region of the second link image in the mixed image that is subject to the preprocessing; and sequentially output the second link image to the second display unit.

2. The vehicle controller according to claim 1, wherein the mixed image is formed by synthesizing the plurality of link images such that the plurality of link images is arranged in the frame without information of a non-display region between the plurality of link images, and the non-display region is not displayed by any one of the plurality of display units.

3. The vehicle controller according to claim 1, wherein the plurality of link images are two link images, the plurality of display units are two display units corresponding to the two link images, the mixed image is formed by synthesizing the two link images in the frame, and when the two link images have different screen resolutions, the two link images are synthesized in the frame by rotating a first one of the two link images having a long side with a smaller number of pixels such that the long side of the first one is laid along a short side of a second one of the two link images having a long side with a larger number of pixels.

4. The vehicle controller according to claim 1, further comprising a synthesizer that is configured to generate the mixed image by synthesizing, in the frame, two or more of the plurality of link images that are to be linked to each other among the plurality of link images, wherein the single display processing unit is configured to perform the preprocessing by performing the preprocessing over the mixed image generated by the synthesizer.

5. The vehicle controller according to claim 1, wherein each of the plurality of image output units is given a priority of an order of outputting to the corresponding one of plurality of display units, and the priority given to one of the plurality of image output units is the same as the priority given to an other of the plurality of image output units.

6. A vehicle display system, comprising:

a plurality of display units disposed in a vehicle interior; and the vehicle controller according to claim 1 that is configured to control the plurality of display units.

7. A vehicle controller that is configured to control a plurality of display units disposed in a vehicle interior, the vehicle controller comprising:

a single display processing unit that is configured to perform preprocessing on a plurality of link images for the plurality of display units such that each of the plurality of link images is able to be output to a corresponding one of the plurality of display units, the plurality of link images being displayed in a linked manner across the plurality of display units; and a plurality of image output units each of which is configured to output a respective one of the plurality of link images to the corresponding one of the plurality of display units after the plurality of link images are subject to the preprocessing by the single display processing unit, wherein the single display processing unit is configured to perform the preprocessing on the plurality of link images by performing the preprocessing on a mixed image formed by synthesizing the plurality of link images into a frame, and each of the plurality of image output units is configured to:

specify a region of the respective one of the plurality of link images in the mixed image that is subject to the preprocessing by the single display processing unit; and output the respective one of the plurality of link images to the corresponding one of the plurality of display units, wherein the mixed image is formed by synthesizing the plurality of images in each of frames that are displayed in a chronological order to provide an animation, the single display processing unit is configured to sequentially perform, for each of the frames, the preprocessing on the mixed image, and each time the single display processing unit sequentially performs the preprocessing, each of the plurality of image output units is configured to:

specify a region of the respective one of the plurality of link images in the mixed image that is subject to the preprocessing; and sequentially output the respective one of the plurality of link images to the corresponding one of the plurality of display units, wherein when each of the plurality of display units has a different frame rate, which is a number of images per unit time for the plurality of link images when displaying the animation, the mixed image is formed by synthesizing the plurality of link images at a frame rate corresponding to a highest frame rate of a first display unit among the plurality of display units that corresponds to a first link image of the plurality of link images, a second link image of the plurality of link images corresponding to a second display unit of the plurality of display units having a lower frame rate than the highest frame rate is synthesized with the first link image in every $N^{th}$ frame, wherein N is a number according to a ratio of the highest frame rate to the lower frame rate, whereas the second link image is synthesized as empty data with the first link image in other frames, a first image output unit of the plurality of image output units corresponding to the first display unit is configured to, each time the single display processing unit sequentially performs the preprocessing:
  specify a region of the first link image in the mixed image that is subject to the preprocessing; and
  sequentially output the first link image to the first display unit, and a second image output unit of the plurality of image output units corresponding to the second display unit is configured to, in every $N^{th}$ frame:
  specify a region of the second link image in the mixed image that is subject to the preprocessing; and
  sequentially output the second link image to the second display unit.

8. The vehicle controller according to claim 7, wherein when the plurality of link images has different screen resolutions, the mixed image is formed such that the mixed image in the frame has a minimum size by rotating at least one of the plurality of link images.

9. A vehicle control method for controlling a plurality of display units disposed in a vehicle interior, the method comprising:
  performing, with a single processing unit, preprocessing on a plurality of link images for the plurality of display units such that each of the plurality of link images is able to be output to a corresponding one of the plurality of display units, the plurality of link images being displayed in a linked manner across the plurality of display units; and
  outputting, with a plurality of display output units, each of the plurality of link images to the corresponding one of the plurality of display units after performing the preprocessing on the plurality of link images by the single display processing unit, wherein the method further comprises:
  performing, with the single processing unit, the preprocessing on the plurality of link images by performing the preprocessing on a mixed image formed by synthesizing the plurality of link images into a frame;
  specifying, with each of the plurality of image output units, a region of the respective one of the plurality of link images in the mixed image that is subject to the preprocessing by the single display processing unit;
  outputting, with each of the plurality of image output units, the respective one of the plurality of link images to the corresponding one of the plurality of display units; and
  when the plurality of link images has different screen resolutions, forming the mixed image such that the mixed image in the frame has a minimum size by rotating at least one of the plurality of link images;
  forming the mixed image by synthesizing the plurality of images in each of frames that are displayed in a chronological order to provide an animation,
  sequentially performing, for each of the frames with the single display processing unit, the preprocessing on the mixed image,
  each time the single display processing unit sequentially performs the preprocessing, with each of the plurality of image output units:
    specifying a region of the respective one of the plurality of link images in the mixed image that is subject to the preprocessing; and
    sequentially outputting the respective one of the plurality of link images to the corresponding one of the plurality of display units;
  when each of the plurality of display units has a different frame rate, which is a number of images per unit time for the plurality of link images when displaying the animation, forming the mixed image by synthesizing the plurality of link images at a frame rate corresponding to a highest frame rate of a first display unit among the plurality of display units that corresponds to a first link image of the plurality of link images,
  synthesizing a second link image of the plurality of link images corresponding to a second display unit of the plurality of display units having a lower frame rate than the highest frame rate with the first link image in every $N^{th}$ frame, wherein N is a number according to a ratio of the highest frame rate to the lower frame rate, whereas synthesizing the second link image as empty data with the first link image in other frames,
  each time the single display processing unit sequentially performs the preprocessing, with a first image output unit of the plurality of image output units corresponding to the first display unit:
    specifying a region of the first link image in the mixed image that is subject to the preprocessing; and
    sequentially outputting the first link image to the first display unit, and
  in every $N^{th}$ frame, with a second image output unit of the plurality of image output units corresponding to the second display unit:
    specifying a region of the second link image in the mixed image that is subject to the preprocessing; and
    sequentially outputting the second link image to the second display unit.

10. A vehicle control method for controlling a plurality of display units disposed in a vehicle interior, the method comprising:
  performing, with a single processing unit, preprocessing on a plurality of link images for the plurality of display units such that each of the plurality of link images is able to be output to a corresponding one of the plurality of display units, the plurality of link images being displayed in a linked manner across the plurality of display units; and
  outputting, with a plurality of display output units, each of the plurality of link images to the corresponding one of the plurality of display units after performing the preprocessing on the plurality of link images by the single display processing unit, wherein the method further comprises:
  performing, with the single processing unit, the preprocessing on the plurality of link images by performing the preprocessing on a mixed image formed by synthesizing the plurality of link images into a frame;
  specifying, with each of the plurality of image output units, a region of the respective one of the plurality of link images in the mixed image that is subject to the preprocessing by the single display processing unit; and
  outputting, with each of the plurality of image output units, the respective one of the plurality of link images to the corresponding one of the plurality of display units, wherein the method further comprises:

forming the mixed image by synthesizing the plurality of images in each of frames that are displayed in a chronological order to provide an animation;

sequentially performing, for each of the frames with the single display processing unit, the preprocessing on the mixed image;

each time sequentially performing the preprocessing,
  specifying, with each of the plurality of image output units, a region of the respective one of the plurality of link images in the mixed image that is subject to the preprocessing; and
  sequentially outputting, with each of the plurality of image output units, the respective one of the plurality of link images to the corresponding one of the plurality of display units, wherein the method further comprises:

when each of the plurality of display units have a different frame rate, which is a number of images per unit time for the plurality of link images when displaying the animation,
  forming the mixed image by synthesizing the plurality of link images at a frame rate corresponding to a highest frame rate of a first display unit among the plurality of display units that corresponds to a first link image of the plurality of link images;
  synthesizing a second link image of the plurality of link images corresponding to a second display unit of the plurality of display units having a lower frame rate than the highest frame rate with the first link image in every $N^{th}$ frame, wherein N is a number according to a ratio of the highest frame rate to the lower frame rate, whereas synthesizing the second link image as empty data with the first link image in other frames;

each time sequentially performing the preprocessing,
  specifying, with a first image output unit of the plurality of image output units corresponding to the first display unit, a region of the first link image in the mixed image that is subject to the preprocessing; and
  sequentially outputting, with the first image output unit, the first link image to the first display unit;

in every $N^{th}$ frame,
  specifying, with a second image output unit of the plurality of image output units corresponding to the second display unit, a region of the second link image in the mixed image that is subject to the preprocessing; and
  sequentially outputting, with the second image output unit, the second link image to the second display unit.

\* \* \* \* \*